United States Patent
Yu et al.

(10) Patent No.: US 10,749,755 B2
(45) Date of Patent: Aug. 18, 2020

(54) NETWORK TOPOLOGY SELF-ADAPTING DATA VISUALIZATION METHOD, DEVICE, APPARATUS, AND STORAGE MEDIUM

(71) Applicant: PING AN TECHNOLOGY (SHENZHEN) CO., LTD., Shenzhen, Guangdong (CN)

(72) Inventors: Binhe Yu, Shenzhen (CN); Jianming Wang, Shenzhen (CN); Jing Xiao, Shenzhen (CN)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 101 days.

(21) Appl. No.: 15/772,802

(22) PCT Filed: Mar. 10, 2017

(86) PCT No.: PCT/CN2017/076291
§ 371 (c)(1),
(2) Date: May 1, 2018

(87) PCT Pub. No.: WO2018/120423
PCT Pub. Date: Jul. 5, 2018

(65) Prior Publication Data
US 2019/0273660 A1  Sep. 5, 2019

(30) Foreign Application Priority Data
Dec. 29, 2016 (CN) .......................... 2016 1 1249511

(51) Int. Cl.
*H04L 12/24* (2006.01)
*G06F 16/174* (2019.01)
*H04L 29/08* (2006.01)

(52) U.S. Cl.
CPC ........ *H04L 41/145* (2013.01); *G06F 16/1748* (2019.01); *H04L 41/12* (2013.01);
(Continued)

(58) Field of Classification Search
CPC ... H04L 41/145; H04L 67/2842; H04L 41/22; H04L 41/12; H04L 67/16; H04L 41/5058; G06F 16/1748; G06F 16/248
See application file for complete search history.

(56) References Cited

U.S. PATENT DOCUMENTS 9,767,170 B2 * 9/2017 Osias ................... G06F 16/248
2009/0287991 A1 11/2009 Nakamura et al.
(Continued)

FOREIGN PATENT DOCUMENTS

| CN | 104504082 A | 4/2015 |
|----|-------------|--------|
| CN | 106202353 A | 12/2016 |
| JP | 201206064 A | 3/2012 |

OTHER PUBLICATIONS

International Search Report dated Sep. 30, 2017 in International Application No. PCT/CN2017/076291.
(Continued)

*Primary Examiner* — Brian T O Connor
(74) *Attorney, Agent, or Firm* — Loza & Loza, LLP; Michael F. Fedrick

(57) ABSTRACT

The present application discloses a network topology self-adapting data visualization method, device, apparatus, and storage medium. The network topology self-adapting data visualization method includes: preprocessing nodes, output the preprocessed nodes; processing the preprocessed nodes by the force guidance layout algorithm to form an initial network topology graph; performing de-duplication processing for the duplicated preprocessed nodes in the initial network topology graph and outputting the de-duplicated
(Continued)

nodes; and forming an object network topology graph on the basis of the de-duplicated nodes. By means of the network topology self-adapting data visualization method, data visualization and automation can be achieved, the data visualization processing procedure is simplified, manual intervention is not needed, the manual intervention cost can be effectively reduced, and the processing efficiency is improved.

15 Claims, 4 Drawing Sheets

(52) U.S. Cl.
CPC .......... *H04L 41/22* (2013.01); *H04L 67/2842* (2013.01); *H04L 41/5058* (2013.01); *H04L 67/16* (2013.01)

(56) References Cited

U.S. PATENT DOCUMENTS

| | | |
|---|---|---|
| 2013/0232452 A1 | 9/2013 | Krajec et al. |
| 2016/0110431 A1* | 4/2016 | Osias .................... G06F 16/248 707/755 |
| 2018/0062932 A1* | 3/2018 | Cohn ...................... H04L 41/12 |

OTHER PUBLICATIONS

Bilgic, Mustafa et al. "D-Dupe: An Interactive Tool for Entity Resolution in Social Networks", GD 2005, LNCS 3843, pp. 505-507, 2005, 3 pages.
Japanese Office Action for Japanese Patent Application No. 2018-516720 dated Aug. 9, 2019, 7 pages.
Examination Report for Australian Patent Application No. 2017341160 dated Oct. 23, 2019, 5 pgs.

\* cited by examiner

NETWORK TOPOLOGY SELF-ADAPTING DATA VISUALIZATION METHOD, DEVICE, APPARATUS, AND STORAGE MEDIUM

CROSS REFERENCE TO RELATED APPLICATIONS

The present application is the U.S. national stage of International Patent Application No. PCT/CN2017/076291, filed on Mar. 10, 2017 and entitled NETWORK TOPOLOGY SELF-ADAPTING DATA VISUALIZATION METHOD, DEVICE, APPARATUS, AND STORAGE MEDIUM, which claims the benefit of priority under 35 U.S.C. § 119 from of Chinese Patent Application No. 201611249511.2, having the title of "NETWORK TOPOLOGY SELF-ADAPTING DATA VISUALIZATION METHOD AND DEVICE" filed on Dec. 29, 2016. The disclosures of the foregoing applications are incorporated herein by reference in their entirety.

FIELD

The subject matter herein generally relates to data visualization field, in particular to a network topology self-adapting data visualization method, device, apparatus, and storage medium.

BACKGROUND

Data visualization means building visual images with computer graphics to help people understand large and complex scientific results and concepts in real life. Visualization technology is especially important in complex network research, which can help to present or interpret complex network data or models, then discover various patterns, characteristics, and relationships.

At present, the process of the data visualization is mainly that debugging and configuring parameters with professional software tools, and then exploring the object of visual results. In the process of current data visualization, it is necessary that professional staffs make tedious data adjustment, comprising adjusting node color, node size, and network shape, etc, thus the workload is heavy and the work is tedious. After the data has been updated, the data has to be re-adjusted by professional staffs, overlapping work is too much and cumbersome, because of which cannot achieve the goal that updating data synchronously. In addition, the duplicated nodes in the current data visualization process makes some nodes cannot be rendered completely, which leads to the unclear topology structure and needs manual reprocessing, thus the work is heavy and tedious and it is not conducive to data visualization efficiency.

SUMMARY

The present application provides a network topology self-adapting data visualization method, device, apparatus, and storage medium, to solve the problem that manual data adjustment is necessary in the process of data visualization.

The technical solution for solving the technical problems of the present application is as follows:

In the first aspect, a network topology self-adapting data visualization method is provided, and the network topology self-adapting data visualization method comprises:

preprocessing nodes and outputting the preprocessed nodes;

processing the preprocessed nodes by Fruchterman-Reingold (FR) algorithm to form an initial network topology graph;

performing de-duplication processing for the duplicated preprocessed nodes in the initial network topology graph and outputting the de-duplicated nodes; and forming an object network topology graph on the basis of the de-duplicated nodes.

In the second aspect, a network topology self-adapting data visualization device is provided, and the network topology self-adapting data visualization device comprises:

a node preprocessing unit, configured to preprocess nodes and outputting the preprocessed nodes;

an initial network topology graph forming unit, configured to process each preprocessed node by Fruchterman-Reingold (FR) algorithm to form an initial network topology graph;

a de-duplication processing unit configured to:

perform de-duplication processing for the duplicated preprocessed nodes in the initial network topology graph, and
output the de-duplicated nodes; and an object network topology graph forming unit, configured to form an object network topology graph on the basis of the de-duplicated nodes.

In the third aspect, a network topology self-adapting data visualization apparatus is provided, the network topology self-adapting data visualization apparatus comprises: a processor and a storage, the storage stores at least one computer executable instruction, and the processor executes the computer executable instruction to execute the following steps:

preprocessing nodes and outputting the preprocessed nodes;

processing the preprocessed nodes by Fruchterman-Reingold (FR) algorithm to form an initial network topology graph;

performing de-duplication processing for the duplicated preprocessed nodes in the initial network topology graph and outputting the de-duplicated nodes; and forming an object network topology graph on the basis of the de-duplicated nodes.

In the fourth aspect, a network topology self-adapting data visualization storage medium is provided, the network topology self-adapting data visualization storage medium stores one or more computer-readable instructions, the computer-readable instructions are executed by one or more processors to enable the one or more processors to execute the network topology self-adapting data visualization method.

Compared with the prior art, the present application has the following advantages: the network topology self-adapting data visualization method, device, apparatus, and storage medium provided by the present application can realize automation of data visualization, simplify data visualization process without manual intervention, save the cost of manual intervention, and improve the processing efficiency. Furthermore, in the network topology self-adapting data visualization method, device, apparatus, and storage medium, the preprocessed nodes of the duplicated nodes are performed de-duplication processing to eliminate duplication between nodes, so that each node can be presented completely, and the finally generated object network topology graph is clear and has strong display ability. Moreover, the network topology self-adapting data visualization method, device, apparatus, and storage medium, can realize automatic and synchronous updating of data, so that business needs analysis and exploration with can be real-time.

BRIEF DESCRIPTION OF THE DRAWINGS

In order to illustrate technical solutions in embodiments of the present application or in the prior art more clearly, drawings required being used in description of the embodiments or of the prior art will be briefly introduced below. Obviously, the drawings in the below description are merely some embodiments of the present application, and for those ordinary skilled in the art, other drawings can be obtained according to these drawings without creative work.

DETAILED DESCRIPTION OF THE PREFERRED EMBODIMENT

In order to make the purposes, the technical solutions and the advantages of the present application be clearer and more understandable, the present application will be further described in detail below with reference to accompanying figures and embodiments. It should be understood that the specific embodiments described herein are merely intended to illustrate but not to limit the present application.

In order to have a clearer understanding of the technical features, purposes, and effects of the present application, the specific means of implementation of the present application is described in detail.

A First Embodiment

Figure 1:
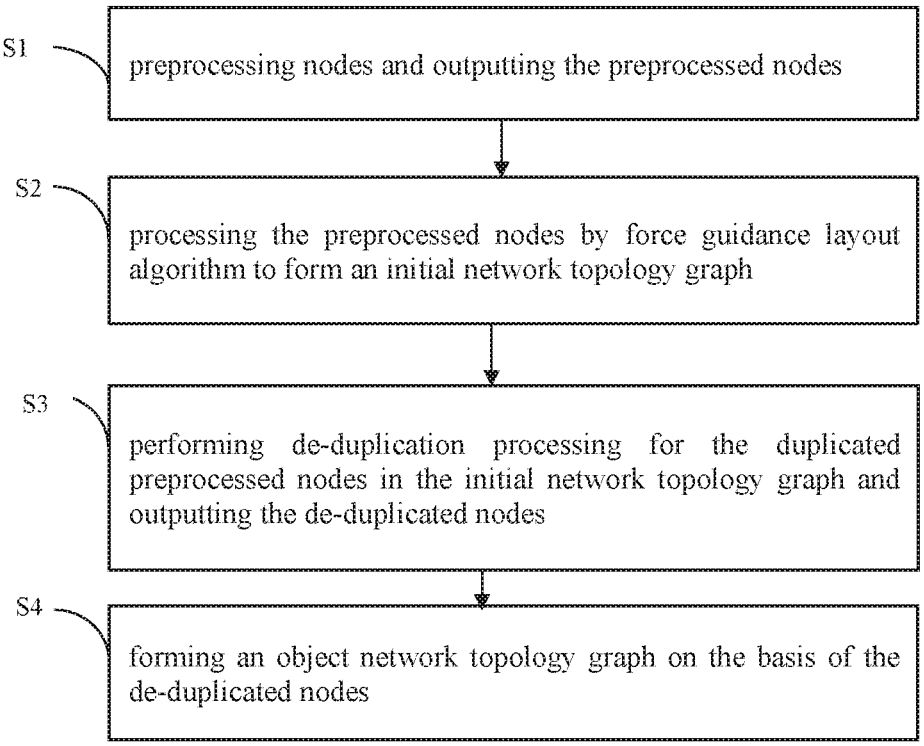
FIG. 1 is an implementing flow chart of a first embodiment of a network topology self-adapting data visualization method.

FIG. 1 illustrates a flow chart of the first embodiment of a network topology self-adapting data visualization method. The network topology self-adapting data visualization method is executed in a network topology self-adapting data visualization device which installs a network topology self-adapting data visualization professional software tool. Wherein, the professional software tool can be can be Gephi, a complex network analysis software, mainly used in various networks and complex systems, and is used for dynamic and layered graph interactive visualization and detection open source tool. FIG. 1 illustrates the first embodiment of the network topology self-adapting data visualization method and the method comprises:

S1: preprocessing nodes and outputting the preprocessed nodes.

Figure 2:
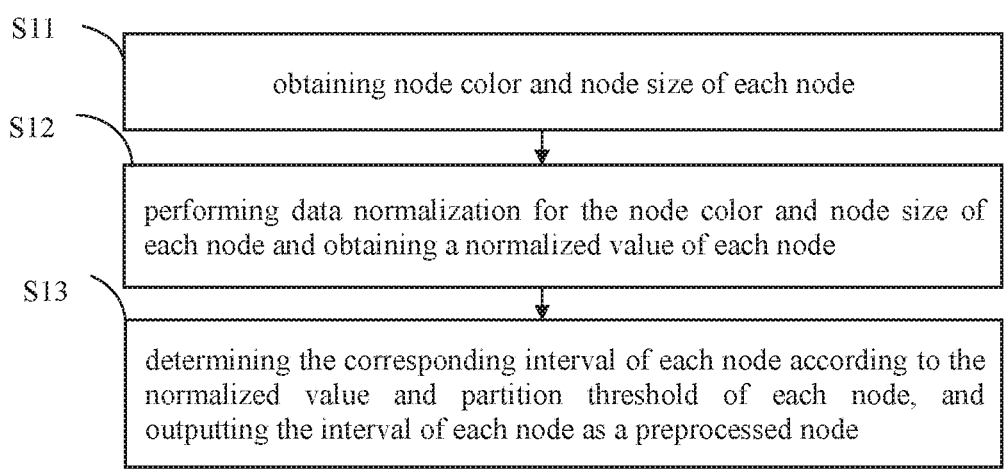
FIG. 2 is a specific implementing flow chart of a step S1 of the network topology self-adapting data visualization method of FIG. 1.

In the embodiment, preprocessing nodes in the software tool of Gephi, the file format of the output preprocessed node is a gexf file format. FIG. 2 illustrates that the step S1 comprises:

S11: obtaining node color and node size of each node.

Thus add a color_t attribute and a size_t attribute to each node, which is shown as follows, the value can be independently set based on actual business scenario, and generate the node color and the node size of each node according to the value of the node color_t attribute and the value of the size_t attribute of each node.

```
<node id="1">
    <attvalues>
        <attvalue for="color_t" value="5"/>
        <attvalue for="size_t" value="1"/>
    </attvalues>
</node>
```

In the embodiment, the professional software tool performing the network topology self-adapting data visualization method is Gephi, the file format of the node color and the node size of each obtained node is the gexf file format. Gephi is an excellent analysis software for the complex network and supports importing multiple formats of files. The gexf format is recommended by Gephi and is a chart file created in the Graph Exchange XML Format (GEXF) language. The GEXF language is a language that describes the structure of a network and is used to the relation diagrams between the specified nodes and edges and user-defined properties attributes.

S12: performing data normalization for the node color and node size of each node and obtaining a normalized value of each node.

Wherein, data normalization is scaling data to a specific range of smaller values, removing unit limits of the data, and converting it into a net number value of no magnitude, thus indicators of different units or orders of magnitude can be compared and weighted.

In the embodiment, after sort the attributes for the node color and node size of each node, perform zero-mean normalization (Z-score) processing, to obtain normalized value of each node. Wherein, the Z-score normalization is the normalization of standard deviation, so that the processed data conforms to the standard normal distribution, that is, the mean value is 0 and the standard deviation is 1, for comparison or weighting based on the output normalized value. In the embodiment, the normalized conversion function of the Z-score normalization is $$x^* = \frac{x - \mu}{\sigma},$$

wherein μ is a mean value of all sample data, and a is a standard deviation value of all standard data.

S13: determining the corresponding interval of each node according to the normalized value and partition threshold of each node, and outputting the interval of each node as a preprocessed node.

Wherein the partition threshold is used to divide the data into a plurality of intervals, and the normalized value of each node formed in step S12 is within a specified interval. The normalized value of each node is compared with the predetermined partition threshold to determine which interval the normalized value of the node is within the partition threshold, and output the corresponding interval of the node as the preprocessed node.

S2: processing the preprocessed nodes by force guidance layout algorithm to form an initial network topology graph.

The force guidance layout algorithm (Fruchterman-Reingold algorithm, FR algorithm) is a kind of physical model for enriching two nodes. In the force guidance layout algorithm, add the static electricity between nodes, and achieve the goal of layout by calculating the total energy of the system and minimizing the energy. The force guidance layout algorithm is calculated as follows:

using a spring model to calculate elastic potential energy, the spring model comprises:

$$E_s = \sum_{i=1}^{n}\sum_{j=1}^{n}\frac{1}{2}k(d(i,j)-s(i,j))^2;$$

using an energy model to calculate dynamic potential energy on the basis of the elastic potential energy, the energy model comprises:

$$E = E_s + \sum_{i=1}^{n}\sum_{j=1}^{n}\frac{rw_iw_j}{d(i,j)^2};$$

wherein, the nodes i and j represent the euclidean distance of the two nodes by d(i, j), s(i, j) represents the natural length of the spring, k is the elastic coefficient, r is the electrostatic constant between the two nodes, w is the weight between the two nodes, $E_s$ is the elastic potential energy, and E is the dynamic potential energy.

In the embodiment, use the spring model to calculate the elastic potential energy, use the energy model to calculate the dynamic potential energy on the basis of the elastic potential energy, and preprocess the preprocessed node through the calculated dynamic potential energy to form the initial network topology graph.

Whether the spring model or the energy model, the essence of the algorithm is to solve an energy optimization problem, the difference between the spring model and the energy model is the composition of the optimization functions. The optimization objects comprise gravity and repulsion, and different algorithms have different expressions for the gravity and the repulsion. The force guidance layout algorithm is easy to understand and implement, and can be used in most network data sets, and has good symmetry and local aggregation.

S3: performing de-duplication processing for the duplicated preprocessed nodes in the initial network topology graph and outputting the de-duplicated nodes.

Figure 3:
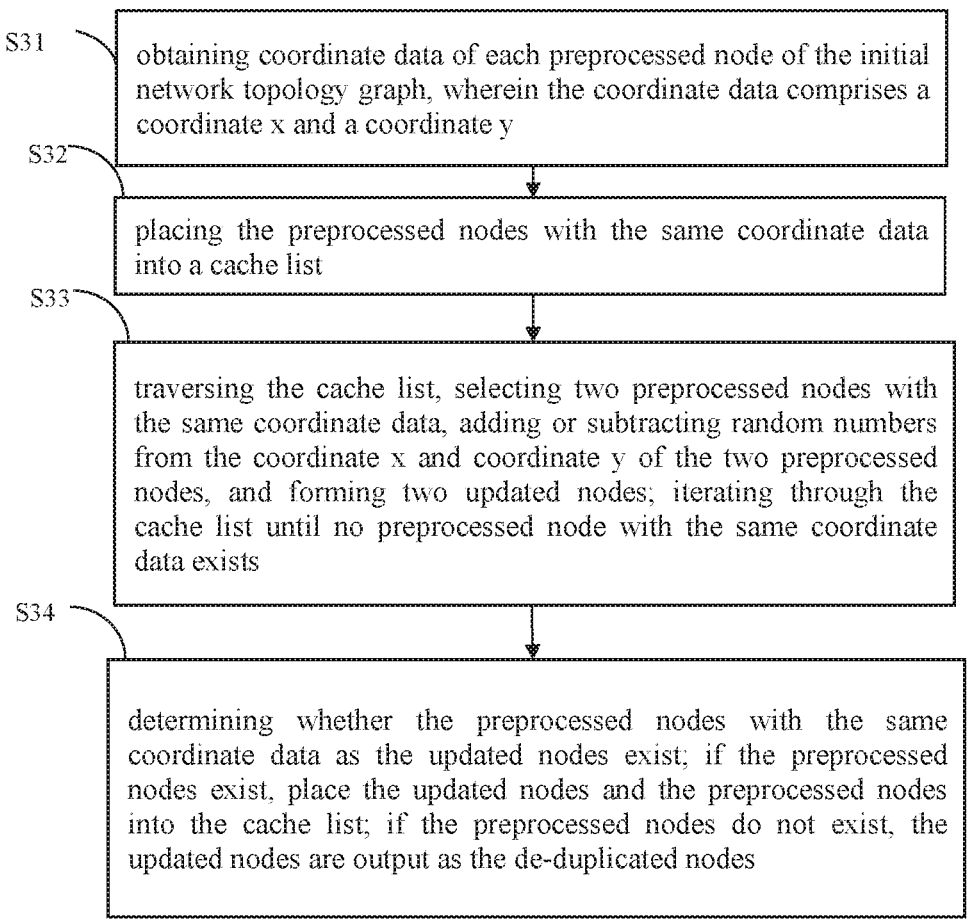
FIG. 3 is a specific implementing flow chart of a step S3 of the network topology self-adapting data visualization method of FIG. 1.

The de-duplicated nodes may exist in the initial network topology graph from the preprocessing nodes processed by the force guidance layout algorithm, and in order to avoid the initial network topology graph is not clear due to the de-duplicated nodes, perform de-duplication processing for the duplicated preprocessed nodes in the initial network topology graph to enable the duplicated nodes to spread out evenly. In the embodiment, the de-duplicated nodes is a non-overlapped node, formed by performing de-duplication processing for the duplicated preprocessed nodes. FIG. 3 illustrates that the step S3 comprises:

S31: obtaining coordinate data of each preprocessed node of the initial network topology graph, wherein the coordinate data comprises a coordinate x and a coordinate y.

In the initial network topology graph, the location of each preprocessed node can be determined by the corresponding coordinate data, that is, the two nodes are duplicated if the coordinate x and the coordinate y of the two nodes are the same.

S32: placing the preprocessed nodes with the same coordinate data into a cache list.

In the embodiment, if there are two preprocessed nodes with the coordinate data (x1, y1), three preprocessed nodes with coordinate data (x2, y2), and four preprocessed nodes with coordinate data (x3, y3) . . . , the step of placing the preprocessed nodes with the same coordinate data into a cache list comprises: using at least two preprocessed nodes with the same coordinate data as a cache node group, and then placing at least one cache node group into the cache list.

S33: traversing the cache list, selecting two preprocessed nodes with the same coordinate data, adding or subtracting random numbers from the coordinate x and coordinate y of the two preprocessed nodes, and forming two updated nodes; iterating through the cache list until no preprocessed node with the same coordinate data exists.

In the embodiment, the random number is randomly generated and is not zero, and is set to k. Understandably, if the random number k is 0, the two non-overlapping updated nodes cannot be formed by adding or subtracting the random number from the coordinate x and the coordinate y of the two preprocessed nodes with the same coordinates.

In the embodiment, if the preprocessed nodes of the coordinate data (x1, y1) are nodes A and B, the coordinate x and the coordinate y of the preprocessed nodes A and B are added or subtracted respectively from the random number k1, thus the two updated nodes A' (x1+k1, y1+k1) and B' (x1−k1, y1−k1) are formed and the two preprocessed nodes A and B are dispersed evenly. Accordingly, if the preprocessed nodes of the coordinate data (x2, y2) are nodes C, D, and E, the coordinate x and the coordinate y of the preprocessed nodes C and D are added or subtracted respectively from a random number k2, thus the two updated nodes C' (x2+k2, y2+k2) and D' (x2−k2, y2−k2) are formed, and the three preprocessed nodes C, D, E are dispersed evenly. If the preprocessed nodes of the coordinate data (x3, y3) are nodes F, G, H, and I, the coordinate x and the coordinate y of the preprocessed nodes F and G are added or subtracted respectively from a random number k3, the coordinate x and the coordinate y of the preprocessed nodes H and I are added or subtracted respectively from a random number k4, thus the four updated nodes F' (x3+k3, y3+k3), G' (x3−k3, y3−k3), H' (x3+k4,y3+k4), and I' (x3−k4,y3−k4) are formed, and the four preprocessed nodes F, G, H, and I, are dispersed evenly . . . . Traverse through all preprocessed nodes in the cache list with the same coordinate data until at least two preprocessed nodes with the same coordinate data do not exist in the cache list.

S34: determining whether the preprocessed nodes with the same coordinate data as the updated nodes exist; if the preprocessed nodes exist, place the updated nodes and the preprocessed nodes into the cache list; if the preprocessed nodes do not exist, the updated nodes are output as the de-duplicated nodes.

Because the updated nodes formed by traversing the cache list may have the same coordinate data as other preprocessed nodes not being placed into the cache list, thus the duplicated node still exists. It is necessary to determine whether the preprocessed nodes with the same coordinate data as the updated nodes exist. If the preprocessed nodes with the same coordinate data as the updated nodes exist, the updated node and the preprocessed node are placed into the cache list as a group of cache nodes, and the step S33 is executed; if the preprocessed nodes with the same coordinate data as the updated nodes do not exist, output the updated nodes as the de-duplicated nodes to execute step S4. Understandably, other preprocessed nodes in the initial network topology graph that are not in the cache list are also output as the de-duplicated nodes.

S4: forming an object network topology graph on the basis of the de-duplicated nodes.

In the embodiment, the computer performing the network topology self-adapting data visualization method receives the de-duplicated nodes and displays the object network topology graph in the browser on the basis of all de-duplicated nodes, to display the data visualization result. When the background data is updated, recalculate on the basis of the steps S1-S4, thus the browser can display the data visualization result of the latest data, to enable the data to be updated synchronously without the professional data adjustment, which is beneficial to saving cost and improving the processing efficiency of data visualization.

Furthermore, because the file format of the output preprocessed node from the step S1 is the gexf file format, and no file format conversion for the output initial network topology graph and de-duplicated nodes in the step S2 and the step S3, thus the file format of the output preprocessed nodes is still the gexf file format. In the process of forming the object network topology graph based on de-duplicated nodes, the data transmission of the gexf file format is large and the response time is slow.

In order to overcome the above problems, the network topology self-adapting data visualization method also comprises a step of converting the file format for the de-duplicated nodes and outputting the de-duplicated nodes in json file format, between the steps S3 and S4. JSON file format (JavaScript Object Notation) is a lightweight data exchange format. JSON adopts a text format completely independent of language, which make JSON an ideal data exchange language, JSON is easy to read and write, and easy to parse and generate for a machine.

In the embodiment, the step of converting the file format for the de-duplicated nodes and outputting the de-duplicated nodes in json file format comprises, parsing the gexf file format of the de-duplicated nodes, obtaining the node information and edge information, and outputting the de-duplicated nodes in json file format based on the node information and edge information. Understandably, converting the de-duplicated nodes in the gexf file format to the de-duplicated nodes in the json file format can reduce the network data transmission, improve the response time, and improve the efficiency of data visualization.

The network topology self-adapting data visualization method provided by the embodiment can realize automation of data visualization, simplify data visualization process without manual intervention, save the cost of manual intervention, and improve the processing efficiency. Furthermore, in the network topology self-adapting data visualization method, the preprocessed nodes of the duplicated nodes are performed de-duplication processing to eliminate duplication between nodes, so that each node can be presented completely, and the finally generated object network topology graph is clear and has strong display ability. Moreover, the network topology self-adapting data visualization method can realize automatic and synchronous updating of data, thus business needs analysis and exploration with can be real-time.

A Second Embodiment

Figure 4:
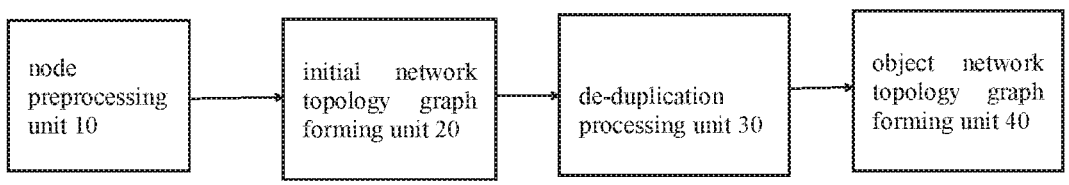
FIG. 4 is a schematic block diagram of a second embodiment of a network topology self-adapting data visualization device.
Figure 5:
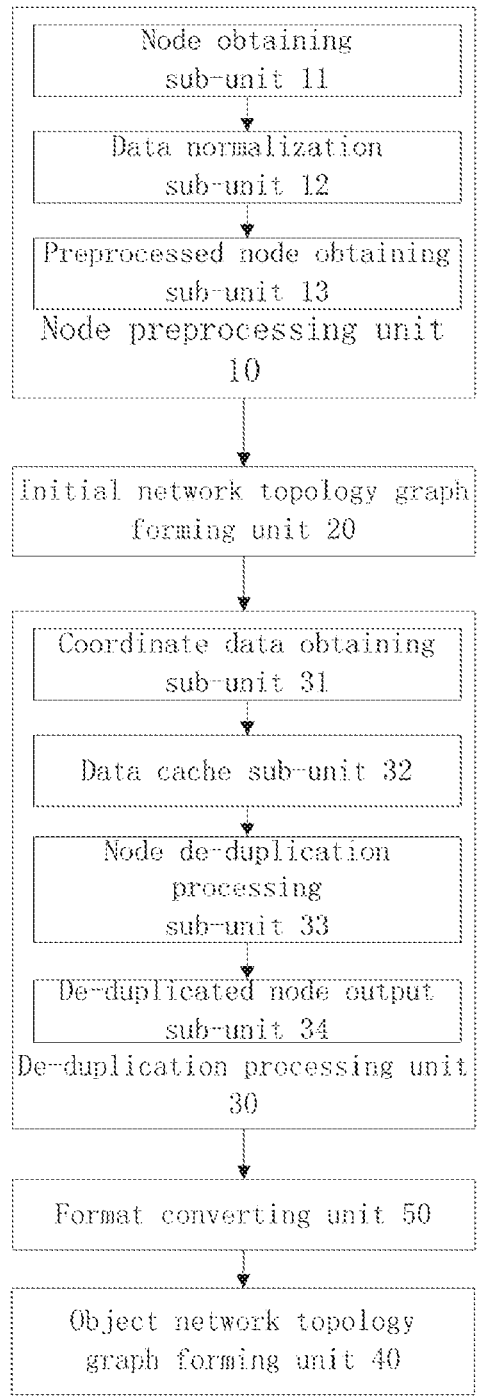
FIG. 5 is a specific schematic block diagram of the network topology self-adapting data visualization device of FIG. 4.

FIG. 4 and FIG. 5 illustrate a schematic block diagram of the network topology self-adapting data visualization device. The network topology self-adapting data visualization device can be executed by a network topology self-adapting data visualization apparatus which installs a network topology self-adapting data visualization professional software tool. Wherein, the professional software tool can be can be Gephi, a complex network analysis software, mainly used in various networks and complex systems, and is used for dynamic and layered graph interactive visualization and detection open source tool. FIG. 4 illustrates that the network topology self-adapting data visualization device comprises a node preprocessing unit 10, an initial network topology graph forming unit 20, a de-duplication processing unit 30, and an object network topology graph forming unit 40.

The node preprocessing unit 10 is configured to preprocess nodes and output the preprocessed nodes.

In the embodiment, preprocess nodes in the software tool of Gephi, the file format of the output preprocessed node is a gexf file format. FIG. 5 illustrates that the node preprocessing unit 10 comprises a node obtaining sub-unit 11, a data normalization sub-unit 12, and a preprocessed node obtaining sub-unit 13.

The node obtaining sub-unit 11 is configured to obtain the node color and the node size of each node.

Thus add a color_t attribute and a size_t attribute to each node, which is shown as follows, the value can be independently set based on actual business scenario, and generate the node color and the node size of each node according to the value of the node color_t attribute and the value of the size_t attribute of each node.

```
<node id="1">
    <attvalues>
        <attvalue for="color_t" value="5"/>
        <attvalue for="size_t" value="1"/>
    </attvalues>
</node>
```

In the embodiment, the professional software tool performing the network topology self-adapting data visualization method is Gephi, the file format of the node color and the node size of each obtained node is the gexf format. Gephi is an excellent analysis software for the complex network and supports importing multiple formats of files. The gexf format is recommended by Gephi and is a chart file created in the Graph Exchange XML Format (GEXF) language. The GEXF language is a language that describes the structure of a network and is used to the relation diagrams between the specified nodes and edges and user-defined properties attributes.

The data normalization sub-unit 12 is configured to perform data normalizing data for the node color and node size of each node and obtain a normalized value of each node.

Wherein, data normalization is scaling data to a specific range of smaller values, removing unit limits of the data, and converting it into a net number value of no magnitude, thus indicators of different units or orders of magnitude can be compared and weighted.

In the embodiment, after sort the attributes for the node color and node size of each node, perform zero-mean normalization (Z-score) processing, to obtain normalized value of each node. Wherein, the Z-score normalization is the normalization of standard deviation, so that the processed data conforms to the standard normal distribution, that is, the mean value is 0 and the standard deviation is 1, for comparison or weighting based on the output normalized value. In the embodiment, the normalized conversion function of the Z-score normalization is $$x^* = \frac{x - \mu}{\sigma},$$

wherein μ is a mean value of all sample data, a is the standard deviation value of all standard data.

The preprocessed node obtaining sub-unit 13 is configured to determine the corresponding interval of each node according to the normalized value and partition threshold of each node, and output the interval of each node as a preprocessed node.

Wherein the partition threshold is used to divide the data into a plurality of intervals, and the normalized value of each node formed in step S12 is within a specified interval. The normalized value of each node is compared with the predetermined partition threshold to determine which interval the normalized value of the node is within the partition threshold, and output the corresponding interval of the node as the preprocessed node.

The initial network topology graph forming unit 20 is configured to process each preprocessed node by force guidance layout algorithm to form an initial network topology graph.

The force guidance layout algorithm (Fruchterman-Reingold algorithm, FR algorithm) is a kind of physical model for enriching two nodes. In the force guidance layout algorithm, add the static electricity between nodes, and achieve the goal of layout by calculating the total energy of the system and minimizing the energy. The force guidance layout algorithm is calculated as follows:

using a spring model to calculate elastic potential energy, the spring model comprises:

$$E_s = \sum_{i=1}^{n} \sum_{j=1}^{n} \frac{1}{2} k (d(i, j) - s(i, j))^2;$$

using an energy model to calculate dynamic potential energy on the basis of the elastic potential energy, the energy model comprises:

$$E = E_s + \sum_{i=1}^{n} \sum_{j=1}^{n} \frac{r w_i w_j}{d(i, j)^2};$$

wherein, the nodes i and j represent the euclidean distance of the two nodes by d(i, j), s(i, j) represents the natural length of the spring, k is the elastic coefficient, r is the electrostatic constant between the two nodes, w is the weight between the two nodes, $E_s$ is the elastic potential energy, and E is the dynamic potential energy.

In the embodiment, use a spring model to calculate elastic potential energy, use the energy model to calculate the dynamic potential energy on the basis of the elastic potential energy, and preprocess the preprocessed node through the calculated dynamic potential energy to form the initial network topology graph.

Whether the spring model or the energy model, the essence of the algorithm is to solve an energy optimization problem, the difference between the spring model and the energy model is the composition of the optimization functions. The optimization objects comprise gravity and repulsion, and different algorithms have different expressions for the gravity and the repulsion. The force guidance layout algorithm is easy to understand and implement, and can be used in most network data sets, and has good symmetry and local aggregation.

The de-duplication processing unit 30 is configured to perform de-duplication processing for the duplicated preprocessed nodes in the initial network topology graph and output the duplicated preprocessed nodes.

The de-duplicated nodes may exist in the initial network topology graph from the preprocessing nodes processed by the force guidance layout algorithm, and in order to avoid the initial network topology graph is not clear due to the de-duplicated nodes, perform de-duplication processing for the duplicated preprocessed nodes in the initial network topology graph to enable the duplicated nodes to spread out evenly. In the embodiment, the de-duplicated nodes is a non-overlapped node, formed by performing de-duplication processing for the duplicated preprocessed nodes. FIG. 5 illustrates that the de-duplication processing unit 30 comprises a coordinate data obtaining 31, a data cache sub-unit 32, a node de-duplication processing sub-unit 33, and a de-duplicated node output sub-unit 34.

The coordinate data obtaining 31 is configured to obtain coordinate data of each preprocessed node of the initial network topology graph, wherein the coordinate data comprises a coordinate x and a coordinate y.

In the initial network topology graph, the location of each preprocessed node can be determined by the corresponding coordinate data, that is, the two nodes are duplicated if the coordinate x and the coordinate y of the two nodes are the same.

The data cache sub-unit 32 is configured to place the preprocessed nodes with the same coordinate data into a cache list.

In the embodiment, if there are two preprocessed nodes with the coordinate data (x1, y1), three preprocessed nodes with coordinate data (x2, y2), and four preprocessed nodes with coordinate data (x3, y3) . . . , the step of placing the preprocessed nodes with the same coordinate data into a cache list comprises: using at least two preprocessed nodes with the same coordinate data as a cache node group, and then placing at least one cache node group into the cache list.

The node de-duplication processing sub-unit 33 is configured to traverse the cache list, select two preprocessed nodes with the same coordinate data, add or subtract random numbers from the coordinate x and coordinate y of the two preprocessed nodes, and form two updated nodes; iterate through the cache list until no preprocessed node with the same coordinate data exists.

In the embodiment, the random number is randomly generated and is not zero, and is set to k. Understandably, if the random number k is 0, the two non-overlapping updated nodes cannot be formed by adding or subtracting the random number from the coordinate x and the coordinate y of the two preprocessed nodes with the same coordinates.

In the embodiment, if the preprocessed nodes of the coordinate data (x1, y1) are nodes A and B, the coordinate x and the coordinate y of the preprocessed nodes A and B are added or subtracted respectively from the random number k1, thus the two updated nodes A' (x1+k1, y1+k1) and B' (x1−k1, y1−k1) are formed and the two preprocessed nodes A and B are dispersed evenly. Accordingly, if the preprocessed nodes of the coordinate data (x2, y2) are nodes C, D, and E, the coordinate x and the coordinate y of the preprocessed nodes C and D are added or subtracted respectively from a random number k2, thus the two updated nodes C' (x2+k2, y2+k2) and D' (x2−k2, y2−k2) are formed, and the three preprocessed nodes C, D, E are dispersed evenly. If the preprocessed nodes of the coordinate data (x3, y3) are nodes F, G, H, and I, the coordinate x and the coordinate y of the preprocessed nodes F and G are added or subtracted respectively from a random number k3, the coordinate x and the coordinate y of the preprocessed nodes H and I are added or subtracted respectively from a random number k4, thus the four updated nodes F' (x3+k3, y3+k3), G' (x3−k3, y3−k3), H' (x3+k4,y3+k4), and I' (x3−k4,y3−k4) are formed, and the four preprocessed nodes F, G, H, and I, are dispersed evenly . . . . Traverse through all preprocessed nodes in the cache list with the same coordinate data until at least two preprocessed nodes with the same coordinate data do not exist in the cache list.

The de-duplicated nodes output sub-unit 34 is configured to determine whether the preprocessed nodes with the same coordinate data as the updated nodes exist; if the preprocessed nodes exist, place the updated nodes and the preprocessed nodes into the cache list; if the preprocessed nodes do not exist, the updated nodes are output as the de-duplicated nodes.

Because the updated nodes formed by traversing the cache list may have the same coordinate data as other preprocessed nodes not being placed into the cache list, thus node overlap still exists. It is necessary to determine whether the preprocessed nodes with the same coordinate data as the updated nodes exist. If the preprocessed nodes with the same coordinate data as the updated nodes exist, the updated node and the preprocessed node are placed into the cache list as a group of cache nodes, and jump to the node de-duplication processing sub-unit 33; if the preprocessed nodes with the same coordinate data as the updated nodes do not exist, output the updated nodes as the de-duplicated nodes, and jump to the object network topology graph forming unit 40. Understandably, other preprocessed nodes in the initial network topology graph that are not in the cache list are also output as the de-duplicated nodes.

The object network topology graph forming unit 40 is configured to form an object network topology graph on the basis of the de-duplicated nodes.

In the embodiment, the computer performing the network topology self-adapting data visualization device receives the de-duplicated nodes and displays the object network topology graph in the browser based on all de-duplicated nodes, to display the data visualization result. When the background data is updated, recalculate based on the node preprocessing unit 10, the initial network topology graph forming unit 20, the de-duplication processing unit 30, and the object network topology graph forming unit 40, thus the browser can display the data visualization result of the latest data, to enable the data to be updated synchronously without the professional data adjustment, which is beneficial to saving cost and improving the processing efficiency of data visualization.

Furthermore, because the file format of the output preprocessed node from the node preprocessing unit 10 is the gexf file format, and no file format conversion for the output initial network topology graph and de-duplicated nodes in the initial network topology graph forming unit 20 and the de-duplication processing unit 30, thus the file format of the output preprocessed nodes is still the gexf file format. In the process of forming the object network topology graph based on de-duplicated nodes, the data transmission of the gexf file format is large and the response time is slow.

In order to overcome the above problems, the network topology self-adapting data visualization device further comprises a format converting unit 50. The format converting unit 50 is configured to convert the file format for the de-duplicated nodes which output from the de-duplication processing unit 30 and output the de-duplicated nodes in json file format, and send the de-duplicated nodes in the json file format to the object network topology graph forming unit 40. JSON (JavaScript Object Notation) file format is a lightweight data exchange format. JSON adopts a text format completely independent of language, which make JSON an ideal data exchange language, JSON is easy to read and write, and easy to parse and generate for a machine In the embodiment, the format converting unit 50 is configured to parse the gexf file format of the de-duplicated nodes, obtain the node information and edge information, and output the de-duplicated nodes in json file format based on the node information and edge information. Understandably, converting the de-duplicated nodes in the gexf file format to the de-duplicated nodes in the json file format can reduce the network data transmission, improve the response time, and improve the efficiency of data visualization.

The network topology self-adapting data visualization device provided by the embodiment can realize automation of data visualization, simplify data visualization process without manual intervention, save the cost of manual intervention, and improve the processing efficiency. Furthermore, in the network topology self-adapting data visualization device, the preprocessed nodes of the overlap nodes are performed de-duplication processing to eliminate overlap between nodes, so that each node can be presented completely, and the finally generated object network topology graph is clear and has strong display ability. Moreover, the network topology self-adapting data visualization device can realize automatic and synchronous updating of data, thus business needs analysis and exploration with can be real-time.

Figure 6:
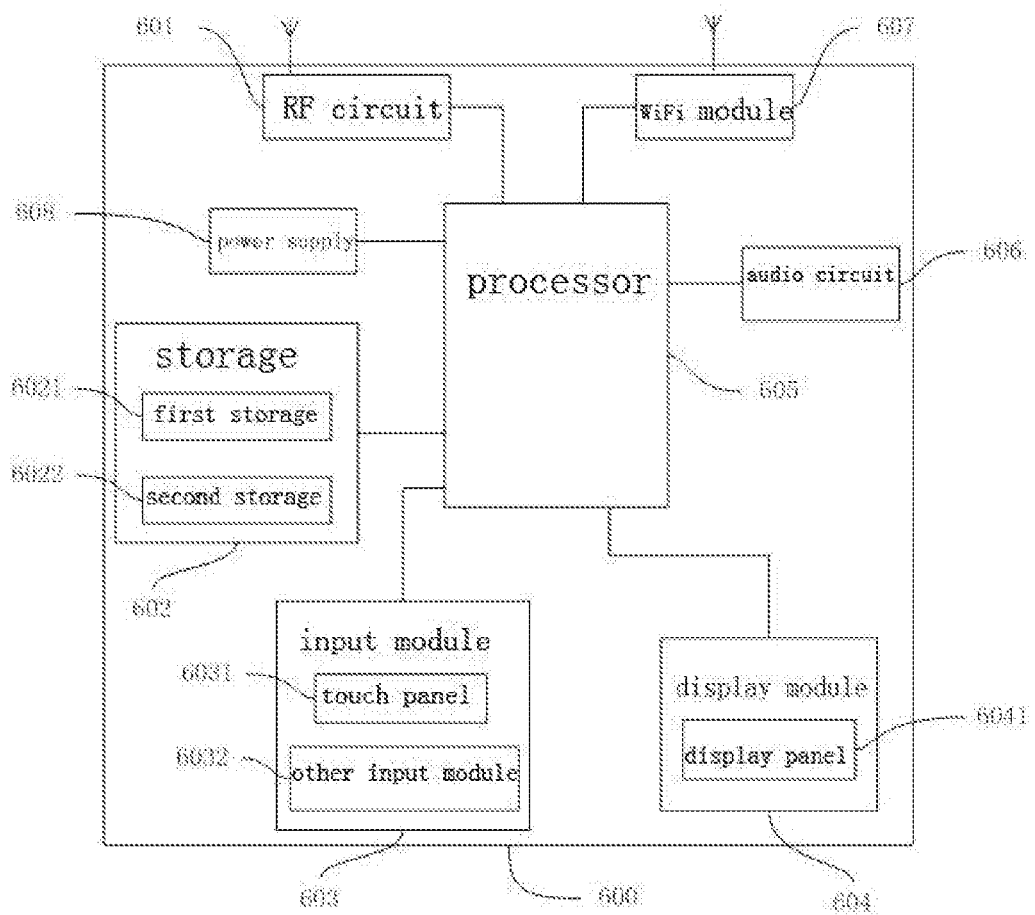
FIG. 6 is a schematic diagram of a third embodiment of a network topology self-adapting data visualization apparatus.

A third embodiment FIG. 6 illustrates a schematic diagram of a third embodiment of a network topology self-adapting data visualization apparatus. In the embodiment, an apparatus 600 of FIG. 6 can be a mobile terminal, such as a mobile phone, a tablet computer, a personal digital assistant (PDA) and/or a car computer; or a terminal, such as a desktop computer, or a server. FIG. 6 illustrates that the apparatus 600 comprises a Radio Frequency (RF) circuit 601, a storage 602, an input module 603, a display module 604, a processor 605, an audio circuit 606, a Wireless Fidelity (WiFi) module 607, and a power supply 608.

The input module 603 and display module 604 are user interaction devices of the apparatus 600 for realizing the interaction between the user and the apparatus 600, for example, receiving a data visualization request input by the user and displaying the corresponding object network topology graph for data visualization operations. The input module 603 is configured to receive a data visualization request input by the user and send the data visualization request to the processor 605. The data visualization request comprises the node. The processor 605 is configured to obtain the object network topology graph based on the received data visualization request and send the object network topology graph to the display module 604. The display module 604 is configured to receive and display the object network topology graph.

In some embodiments, the input module 603 may be configured to receive digital information or character information input by the user and to generate signal input related to the user settings and function control of the apparatus 600.

In some embodiments, the input module 603 may comprise a touch panel 6031. The touch panel 6031, also known as the touchscreen, is configured to collect user touch operations on or near it (for example, user operation with any suitable object or accessory such as a finger, stylus, etc.) and drive the corresponding connection devices according to a predetermined program. Optionally, the touch panel 6031 may comprise a touch detection device and a touch controller. Wherein the touch detection device detects the touch orientation of the user and detects the signal generated by the touch operation, and transmits the signal to the touch controller. The touch controller receives the touched information from the touch detection device, converts the touched information into contact coordinates, sends it to the processor 605, and can receive and execute commands from the processor 605. In addition, the touch panel 6031 can be implemented in a variety of types, comprising resistance-type, capacitance-type, infrared, and surface acoustic. In addition, the input module 603 further comprises other input devices 6032, which may comprise, but are not limited to, a physical keyboard, a function key(such as volume control keys, switch keys, etc.), a trackball, a mouse, a joystick, etc.

Understandably, the touch panel 6031 can cover the display panel 6041 to form a touch display screen. When the touch display screen detects a touch operation on or near it, the touch display screen transmits the touch operation to the processor 605 to determine the type of touch event, then that the processor 605 provides the corresponding visual output on the touch display screen according to the type of the touch event.

Understandably, the touch panel 6031 can cover the display panel 6041 to form a touch display screen. When the touch display screen detects a touch operation on or near it, the touch display screen transmits the touch operation to the processor 605 to determine the type of touch event, then that the processor 605 provides the corresponding visual output on the touch display screen according to the type of the touch event.

The touch display screen comprises an application interface display area and a common control display area. The arrangement mode of the application interface display area and common control display area is not limited, can be arranged up and down, left and right, can distinguish between the two display area arrangement. The application interface display area can be used to display the application interface. Each interface can comprise interface elements such as icons and/or widget desktop controls for at least one application. The application interface display area can also be a blank interface that contains nothing. This common control display area is configured to display high-usage controls, such as setting buttons, interface numbers, scrollbars, phonebook icons, and other application icons.

The WiFi module 607 as a network interface of the apparatus 600, can realize data interaction between the apparatus 600 and other apparatus. In the embodiment, the network interface can be connected to a remote storage device and an external display device by network communication. The network interface is configured to receive the node sent by the remote storage device and send the node to the processor 605. The network interface is also configured to receive the object network topology graph sent by the processor 605 and send the object network topology graph to the external display device. In the embodiment, the remote storage device connected to the network interface through the WiFi network may be a cloud server or other database. The remote storage device stores the node. When the visualization of the node is required, send the node to the WiFi module 607 through the WiFi network.

The storage 602 comprises a first storage 6021 and a second storage 6022. In some embodiments, the first storage 6021 is a non-volatile computer-readable storage medium and stores operating system, database, and computer-readable instruction. The computer-readable instruction can be executed by the processor 605 to implement the network topology self-adapting data visualization method illustrate in the embodiment of FIGS. 1-3. The database stored in the first storage 6021 is configured to store various kinds of data, for example, the various data involved in the network topology self-adapting data visualization method, such as the object network topology graph and the node data. The node data can be either a node generated by the apparatus 600 and stored in a database or a node sent by the remote storage device received through the network interface. The second memory 6021 can be an internal storage of the apparatus 600, provides a cached operating environment for the operating systems, databases, and computer-executable instructions of the non-volatile computer-readable storage medium.

A non-volatile computer-readable storage medium provided by the embodiment, stores one or more computer-readable instructions, the computer-readable instructions are executed by one or more processors to enable the one or more processors to execute the network topology self-adapting data visualization method. The description is not repeated here to avoid repetition.

In the embodiment, the processor 605 is a control center of the apparatus 600, connect each part of the entire mobile phone through various kinds of interfaces and lines, and execute all functions and process data of the apparatus 600 through executing the computer-readable instructions or/the data of the database stored in the first storage 6021, to entirely monitor the apparatus 600. Optionally, the processor 605 may comprises one or more processing modules.

In the embodiment, through executing the computer-readable instructions or/the data of the database stored in the first storage 6021, the processor 605 is configured to execute the following steps: preprocessing nodes and outputting the preprocessed nodes; processing the preprocessed node by force guidance layout algorithm to form an initial network topology graph; performing de-duplication processing for the duplicated preprocessed nodes in the initial network topology graph and outputting the de-duplicated nodes; and forming an object network topology graph on the basis of the de-duplicated nodes.

Preferably, the step of preprocessing nodes and outputting the preprocessed nodes comprises:

obtaining the node color and node size of each node;

performing data normalization for the node color and node size of each node and obtaining a normalized value of each node; and determining the corresponding interval of each node according to the normalized value and partition threshold of each node, the interval of each node being output as a preprocessed node.

Preferably, using a spring model to calculate elastic potential energy, the spring model comprises:

$$E_s = \sum_{i=1}^{n} \sum_{j=1}^{n} \frac{1}{2} k (d(i, j) - s(i, j))^2;$$

using an energy model to calculate dynamic potential energy on the basis of the elastic potential energy, the energy model comprises:

$$E = E_s + \sum_{i=1}^{n} \sum_{j=1}^{n} \frac{rw_i w_j}{d(i,j)^2};$$

wherein, the nodes i and j represent the euclidean distance of the two nodes by d(i, j), s(i, j) represents the natural length of the spring, k is the elastic coefficient, r is the electrostatic constant between the two nodes, w is the weight between the two nodes, $E_s$ is the elastic potential energy, and E is the dynamic potential energy.

Preferably, the step of performing de-duplication processing for the duplicated preprocessed nodes in the initial network topology graph and outputting the de-duplicated nodes comprises:

obtaining coordinate data of each preprocessed node of the initial network topology graph, wherein the coordinate data comprises a coordinate x and a coordinate y;

placing the preprocessed nodes with the same coordinate data into a cache list;

traversing the cache list, selecting two preprocessed nodes with the same coordinate data, adding or subtracting random numbers from the coordinate x and coordinate y of the two preprocessed nodes, and forming two updated nodes; iterating through the cache list until no preprocessed node with the same coordinate data exists; and determining whether the preprocessed nodes with the same coordinate data as the updated nodes exist; if the preprocessed nodes exist, place the updated nodes and the preprocessed nodes into the cache list; if the preprocessed nodes do not exist, the updated nodes are output as the de-duplicated nodes.

Preferably, the processor 605 further execute the following step: converting the file format for the de-duplicated nodes and outputting the de-duplicated nodes in the j son file format.

The network topology self-adapting data visualization apparatus 600 provided by the embodiment can realize automation of data visualization, simplify data visualization process without manual intervention, save the cost of manual intervention, and improve the processing efficiency. Furthermore, in the network topology self-adapting data visualization apparatus 600, the preprocessed nodes of the duplicated nodes are performed de-duplication processing to eliminate duplication between nodes, so that each node can be presented completely, and the finally generated object network topology graph is clear and has strong display ability. Moreover, the network topology self-adapting data visualization apparatus 600 can realize automatic and synchronous updating of data, thus business needs analysis and exploration with can be real-time.

A fourth embodiment A non-volatile computer-readable storage medium provided by the embodiment, stores one or more computer-readable instructions. The computer-readable instructions are executed by one or more processors to enable the one or more processors to execute the network topology self-adapting data visualization method. The description is not repeated here to avoid repetition.

One of ordinary skill in the art can realize that each of the modules and algorithm steps in each of the examples described with reference to the embodiments disclosed in the present application can be realized by electronic hardware, or by a combination of computer software and electronic hardware. Whether these functions are performed by means of hardware or software depends on a specific application of a technical solution and design restriction conditions. With respect to each of the specific applications, those skilled in the art can use different methods to realize the described functions, but this realization should not be regarded as going beyond the protection scope of the present application.

One of ordinary skill in the art of this field can clearly understand that: for a convenient and brief description, the specific working processes of the aforementioned devices and units can refer to the corresponding processes of the aforesaid method embodiments, and are not repeated here.

In the embodiments provided by the present application, it should be understood that the disclosed method and device can be achieved in other ways. For example, the aforementioned device embodiments are schematic merely, for example, the division of the modules is only a kind of logic function division, and there can be other division manners in actual implementations, for example, a plurality of modules or components can be combined or integrated into another system, or some features can be ignored or unexecuted. Additionally, the displayed or discussed mutual coupling, direct coupling, or communication connections can be indirect coupling or communication connections via some interfaces, devices or modules, and can be of electrical, mechanical, or other types.

The module illustrated as separate components can be, but can also not be, physically separated, and components displayed as module can be, but can also not be, physical module; that is, these components can be located at the same place, but can also be distributed into a plurality of network modules. According to actual requirements, some or all of the modules can be selected to achieve the purposes of the solutions in these embodiments.

In addition, each of the functional modules in each of the embodiments of the present application can be integrated into one processing module, each of the functional modules can also be an independent physical presence, and two or more than two functional modules can also be integrated into one module.

The functions can be stored on a computer-readable storage medium if they are implemented as software function modules and sold or used as independent product. Based on this understanding, the essential technical solution of the present application, in other words, the part making a contribution to the prior art, or some parts of the technical solution can be embodied in the form of a software product, the computer software product is stored in a storage medium and comprises instruction configured to enable a computer apparatus (which can be a personal computer, a server, or a network apparatus, etc.) to execute all or some of the steps of the method of each embodiment of the present application. The aforementioned storage medium comprises various media that can store program codes, such as a USB (Universal Serial Bus) flash disk, a mobile hard disk drive, a Read only Memory (ROM), a Random Access Memory (RAM), a magnetic disk, a compact disc, etc.

The embodiments described above are merely specific embodiments of the present application, but the protection scope of the present application is not limited to these embodiments. In the technical range disclosed by the present application, any change or replacement that can be easily thought out by any one of ordinary skill in the art should be comprised in the protection scope of the present application.

Therefore, the protection scope of the present application should refer to the protection scope of the claims.

What is claimed is:

1. A network topology self-adapting data visualization method, wherein the method comprises:
preprocessing nodes and outputting the preprocessed nodes, wherein the nodes have a file format;
processing the preprocessed nodes by force guidance layout algorithm to form an initial network topology graph;
performing de-duplication processing for duplicated preprocessed nodes in the initial network topology graph and outputting de-duplicated nodes; and
forming an object network topology graph on the basis of the de-duplicated nodes; and
converting the file format of the de-duplicated nodes and outputting the de-duplicated nodes in JSON file format.

2. The network topology self-adapting data visualization method according to claim 1, wherein, the step of preprocessing nodes and outputting the preprocessed nodes comprises:
obtaining node color and node size of each node;
performing data normalization for the node color and node size of each node and obtaining a normalized value of each node; and
determining the corresponding interval of each node according to the normalized value and partition threshold of each node, and outputting the interval of each node as a preprocessed node.

3. The network topology self-adapting data visualization method according to claim 1, wherein, the force guidance layout algorithm comprises:
using a spring model to calculate elastic potential energy, the spring model comprises:

$$E_s = \sum_{i=1}^{n}\sum_{j=1}^{n}\frac{1}{2}k(d(i,j)-s(i,j))^2;$$

using an energy model to calculate dynamic potential energy on the basis of the elastic potential energy, the energy model comprises:

$$E = E_s + \sum_{i=1}^{n}\sum_{j=1}^{n}\frac{rw_iw_j}{d(i,j)^2};$$

wherein, the nodes i and j represent the euclidean distance of the two nodes by d(i, j), s(i, j) represents the natural length of the spring, k is the elastic coefficient, r is the electrostatic constant between the two nodes, w is the weight between the two nodes, $E_s$ is the elastic potential energy, and E the dynamic potential energy.

4. The network topology self-adapting data visualization method according to claim 1, wherein, the step of performing de-duplication processing for the duplicated preprocessed nodes in the initial network topology graph and outputting the de-duplicated nodes comprises:
obtaining coordinate data of each preprocessed node of the initial network topology graph, wherein the coordinate data comprises a coordinate x and a coordinate y;
placing the preprocessed nodes with the same coordinate data into a cache list;
traversing the cache list, selecting two preprocessed nodes with the same coordinate data, adding or subtracting random numbers from the coordinate x and coordinate y of the two preprocessed nodes, and forming two updated nodes; iterating through the cache list until no preprocessed node with the same coordinate data exists; and
determining whether the preprocessed nodes with the same coordinate data as the updated nodes exist; if the preprocessed nodes exist, place the updated nodes and the preprocessed nodes into the cache list; if the preprocessed nodes do not exist, the updated nodes are output as the de-duplicated nodes.

5. A network topology self-adapting data visualization device, wherein, the device comprises:
a node preprocessing unit configured to:
preprocess nodes, wherein the nodes have a file format; and
output the preprocessed nodes;
an initial network topology graph forming unit configured to process each preprocessed node by force guidance layout algorithm to form an initial network topology graph;
a de-duplication processing unit configured to perform de-duplication processing for duplicated preprocessed nodes in the initial network topology graph and output the duplicated preprocessed nodes;
an object network topology graph forming unit configured to form an object network topology graph on the basis of the de-duplicated nodes; and
a format converting unit, wherein the format converting unit is configured to:
convert the file format of the de-duplicated nodes; and
output the de-duplicated nodes in JSON file format.

6. The network topology self-adapting data visualization device according to claim 5, wherein, the node preprocessing unit comprises:
a node obtaining sub-unit configured to obtain the node color and the node size of each node;
a data normalization sub-unit configured to perform data normalizing data for the node color and node size of each node and obtain a normalized value of each node; and
a preprocessed node obtaining sub-unit configured to determine the corresponding interval of each node according to the normalized value and partition threshold of each node, and output the interval of each node as a preprocessed node.

7. The network topology self-adapting data visualization device according to claim 5, wherein, the force guidance layout algorithm comprises:
using a spring model to calculate elastic potential energy, the spring model comprises:

$$E_s = \sum_{i=1}^{n}\sum_{j=1}^{n}\frac{1}{2}k(d(i,j)-s(i,j))^2;$$

using an energy model to calculate dynamic potential energy on the basis of the elastic potential energy, the energy model comprises:

$$E = E_s + \sum_{i=1}^{n}\sum_{j=1}^{n}\frac{rw_iw_j}{d(i,j)^2};$$

wherein, the nodes i and j represent the euclidean distance of the two nodes by d(i, j), s(i, j) represents the natural length of the spring, k is the elastic coefficient, r is the electrostatic constant between the two nodes, w is the weight between the two nodes, $E_s$ is the elastic potential energy, and E is the dynamic potential energy.

8. The network topology self-adapting data visualization device according to claim 5, wherein, the de-duplication processing unit comprises:
   a coordinate data obtaining, configured to obtain coordinate data of each preprocessed node of the initial network topology graph, wherein the coordinate data comprises a coordinate x and a coordinate y
   a data cache sub-unit, configured to place the preprocessed nodes with the same coordinate data into a cache list
   a node de-duplication processing sub-unit configured to traverse the cache list, select two preprocessed nodes with the same coordinate data, add or subtract random numbers from the coordinate x and coordinate y of the two preprocessed nodes, and form two updated nodes; iterate through the cache list until no preprocessed node with the same coordinate data exists; and
   a de-duplicated node output sub-unit configured to determine whether the preprocessed nodes with the same coordinate data as the updated nodes exist; if the preprocessed nodes exist, place the updated nodes and the preprocessed nodes into the cache list; if the preprocessed nodes do not exist, the updated nodes are output as the de-duplicated nodes.

9. A network topology self-adapting data visualization apparatus, wherein the apparatus comprises a processor and a storage, the storage stores computer-readable instruction, the computer-readable instruction is executed by the processor to execute the following steps:
   preprocessing nodes and outputting the preprocessed nodes, wherein the nodes have a file format;
   processing the preprocessed nodes by force guidance layout algorithm to form an initial network topology graph;
   performing de-duplication processing for duplicated preprocessed nodes in the initial network topology graph and outputting de-duplicated nodes; and
   forming an object network topology graph on the basis of the de-duplicated nodes;
   wherein the processor further executes a step of converting the file format for the de-duplicated nodes and outputting the de-duplicated nodes in JSON file format.

10. The network topology self-adapting data visualization apparatus according to claim 9, wherein, the step of preprocessing nodes and outputting the preprocessed nodes comprises:
   obtaining node color and node size of each node;
   performing data normalization for the node color and node size of each node and obtaining a normalized value of each node; and
   determining the corresponding interval of each node according to the normalized value and partition threshold of each node, and outputting the interval of each node as a preprocessed node.

11. The network topology self-adapting data visualization apparatus according to claim 9, wherein, the force guidance layout algorithm comprises:
   using a spring model to calculate elastic potential energy, the spring model comprises:

$$E_s = \sum_{i=1}^{n} \sum_{j=1}^{n} \frac{1}{2} k(d(i, j) - s(i, j))^2;$$

using an energy model to calculate dynamic potential energy on the basis of the elastic potential energy, the energy model comprises:

$$E = E_s + \sum_{i=1}^{n} \sum_{j=1}^{n} \frac{rw_i w_j}{d(i, j)^2};$$

wherein, the nodes i and j represent the euclidean distance of the two nodes by d(i, j), s(i, j) represents the natural length of the spring, k is the elastic coefficient, r is the electrostatic constant between the two nodes, w is the weight between the two nodes, $E_s$ is the elastic potential energy, and E is the dynamic potential energy.

12. The network topology self-adapting data visualization apparatus according to claim 9, wherein, the step of performing de-duplication processing for the duplicated preprocessed nodes in the initial network topology graph and outputting the de-duplicated nodes comprises:
   obtaining coordinate data of each preprocessed node of the initial network topology graph, wherein the coordinate data comprises a coordinate x and a coordinate y;
   placing the preprocessed nodes with the same coordinate data into a cache list;
   traversing the cache list, selecting two preprocessed nodes with the same coordinate data, adding or subtracting random numbers from the coordinate x and coordinate y of the two preprocessed nodes, and forming two updated nodes; iterating through the cache list until no preprocessed node with the same coordinate data exists; and
   determining whether the preprocessed nodes with the same coordinate data as the updated nodes exist; if the preprocessed nodes exist, place the updated nodes and the preprocessed nodes into the cache list; if the preprocessed nodes do not exist, the updated nodes are output as the de-duplicated nodes.

13. The network topology self-adapting data visualization apparatus according to claim 9, wherein, the apparatus further comprises a user interaction device connected to the processor, the user interaction device is configured to receive a data visualization request input by the user and send the data visualization request to the processor; the data visualization request comprises the node; the processor is configured to obtain the object network topology graph based on the received data visualization request and send the object network topology graph to the display module; the user interaction device is configured to receive and display the object network topology graph.

14. The network topology self-adapting data visualization apparatus according to claim 9, wherein, the apparatus further comprises a network interface connected to the processor, the network interface is connected to a remote storage device and an external display device, the network interface is configured to:
   receive the node sent by the remote storage device and send the node to the processor; and
   receive the object network topology graph sent by the processor and send the object network topology graph to the external display device.

15. The network topology self-adapting data visualization apparatus according to claim 9, wherein, the storage stores a database, the database is configured to store the object network topology graph.

\* \* \* \* \*